United States Patent
Woollenweber et al.

[11] Patent Number: 5,904,471
[45] Date of Patent: May 18, 1999

[54] COOLING MEANS FOR A MOTOR-DRIVEN CENTRIFUGAL AIR COMPRESSOR

[75] Inventors: William E. Woollenweber, Carlsbad; Edward M. Halimi, Montecito, both of Calif.

[73] Assignee: Turbodyne Systems, Inc., Carpinteria, Calif.

[21] Appl. No.: 08/770,361

[22] Filed: Dec. 20, 1996

[51] Int. Cl.⁶ ...................................................... F04B 39/06
[52] U.S. Cl. .................... 417/371; 417/307; 417/423.14; 417/423.9
[58] Field of Search ................................... 417/307, 313, 417/366, 371, 423.9, 423.14

[56] References Cited

U.S. PATENT DOCUMENTS

| | | | |
|---|---|---|---|
| 1,622,827 | 3/1927 | Hanson | 417/374 |
| 2,078,499 | 4/1937 | Ljungstrom . | |
| 2,173,489 | 9/1939 | Voigt . | |
| 2,321,126 | 6/1943 | Breuer | 417/371 |
| 2,578,785 | 12/1951 | Davis . | |
| 2,649,048 | 8/1953 | Pezzillo et al. . | |
| 2,782,721 | 2/1957 | White . | |
| 2,829,286 | 4/1958 | Britz . | |
| 3,163,790 | 12/1964 | White . | |
| 3,557,549 | 1/1971 | Webster . | |
| 3,572,982 | 3/1971 | Kozdon . | |
| 3,961,199 | 6/1976 | Bronicki . | |
| 4,356,695 | 11/1982 | Sumi et al. | 60/602 |
| 4,445,337 | 5/1984 | McCreary . | |
| 4,453,381 | 6/1984 | Dinger . | |
| 4,565,505 | 1/1986 | Woollenweber . | |
| 4,641,977 | 2/1987 | Woollenweber . | |
| 4,708,095 | 11/1987 | Luterek . | |
| 4,708,602 | 11/1987 | McEachern, Jr. et al. . | |
| 4,776,168 | 10/1988 | Woollenweber . | |
| 4,827,170 | 5/1989 | Kawamura et al. . | |
| 4,850,193 | 7/1989 | Kawamura . | |
| 4,856,968 | 8/1989 | Armbruster | 417/313 |

(List continued on next page.)

FOREIGN PATENT DOCUMENTS

| | | |
|---|---|---|
| 294985 | 12/1988 | European Pat. Off. . |
| 367406 | 9/1990 | European Pat. Off. . |
| 2479899 | 10/1981 | France . |
| 57-212331 | 12/1982 | Japan . |
| 58-222919 | 12/1983 | Japan . |
| 59-49323 | 3/1984 | Japan . |
| 3202633 | 9/1991 | Japan . |
| 4-112921 | 4/1992 | Japan . |
| 5-5419 | 1/1993 | Japan . |
| 5-288195 | 11/1993 | Japan ...................................... 417/366 |
| 267149 | 8/1927 | United Kingdom . |
| 308585 | 3/1929 | United Kingdom . |

OTHER PUBLICATIONS

SAE Technical Paper 940842 "Turbo–Compound Cooling Systems for Heavy–Duty Diesel Engines", 1994, W.E. Woollenweber.

Proc. Instn. Mech Engrs. vol. 189, 43/75, "Experimental and Theoretical Performance of a Radial Flow Turbocharger Compressor with Inlet Prewhirl", 1975, pp. 177–186, F.J. Wallace, et al.

Primary Examiner—Charles G. Freay
Assistant Examiner—Cheryl J. Tyler
Attorney, Agent, or Firm—Brinks Hofer Gilson & Lione

[57] ABSTRACT

A motor-driven compressor assembly comprises a compressor air intake, a compressor rotor, a compressed air outlet and an electric motor for the compressor rotor, with the air intake of the compressor assembly directing intake airflow to the compressor rotor into a heat transfer relationship with the electric motor. The motor-driven compressor includes an outer casing and an inner housing for the electric motor that together form the air intake so the intake airflow through the air intake so formed cools the motor. The motor housing is, in preferred embodiments, a central barrel carrying the electric motor within an outer casing so the intake airflow surrounds the central barrel. The outer casing may also form a mounting surface for motor control electronics, and provide inner finned surfaces in the path of the intake airflow to cool the control electronics. For some applications, the motor-driven compressor can include an operable air bypass between the compressor's air intake and compressed air outlet.

15 Claims, 4 Drawing Sheets

U.S. PATENT DOCUMENTS

| | | |
|---|---|---|
| 4,878,347 | 11/1989 | Kawamura . |
| 4,882,905 | 11/1989 | Kawamura . |
| 4,885,911 | 12/1989 | Woollenweber et al. . |
| 4,894,991 | 1/1990 | Kawamura . |
| 4,901,530 | 2/1990 | Kawamura . |
| 4,918,923 | 4/1990 | Woollenweber et al. . |
| 4,935,656 | 6/1990 | Kawamura . |
| 4,955,199 | 9/1990 | Kawamura . |
| 4,958,497 | 9/1990 | Kawamura . |
| 4,958,708 | 9/1990 | Kawamura . |
| 4,981,017 | 1/1991 | Hara et al. . |
| 4,998,951 | 3/1991 | Kawamura . |
| 5,025,629 | 6/1991 | Woollenweber . |
| 5,038,566 | 8/1991 | Hara . |
| 5,074,115 | 12/1991 | Kawamura . |
| 5,088,286 | 2/1992 | Muraji . |
| 5,094,587 | 3/1992 | Woollenweber . |
| 5,121,605 | 6/1992 | Oda et al. . |
| 5,176,509 | 1/1993 | Schmider et al. . |
| 5,406,979 | 4/1995 | Kawamura . |
| 5,560,208 | 10/1996 | Halimi et al. . |
| 5,605,045 | 2/1997 | Halimi et al. . |
| 5,816,781 | 10/1998 | Bercot et al. ............................ 417/371 |

COOLING MEANS FOR A MOTOR-DRIVEN CENTRIFUGAL AIR COMPRESSOR

FIELD OF THE INVENTION

This invention relates generally to systems for supplying compressed air and, more particularly, to motor-driven centrifugal air compressors and the use of compressed air for charging the cylinders of an internal combustion engine and for pneumatic conveying of dry bulk materials and for various other industrial processes.

BACKGROUND OF THE INVENTION

Motor-driven compressors currently in use consist of a high-speed, brushless motor mounted in an aluminum housing attached to the back plate of centrifugal compressor. One current motor-driven compressor is shown in FIG. 1. As indicated in FIG. 1, the compressor wheel and casing are similar to those used in commercial internal combustion engine turbochargers. In the operation of such air compressors, the motor is energized from an external power source, such as a battery, through an electronic controller which changes the direct current from the battery to alternating current to produce a rotating magnetic field in the motor windings. The rotating field surrounding the motor magnets attached to the motor shaft generates torque that rotates the compressor wheel and shaft assembly. The compressor wheel induces air from the atmosphere or from an appropriate air cleaner and delivers it from the compressor casing at pressures above atmospheric pressure.

In current motor-driven air compressors, the amount of power produced by the motor on a continuous basis is limited by the temperature generated in the windings and by the temperature level in the electronic controller from the electrical power losses therein. Conventional low-speed motors usually employ some sort of an internal fan attached to the shaft to produce a flow of cooling air through the motor and around its internal components to limit their temperatures, however, with high-speed, brushless motors the use of internal fans become rather difficult to implement.

SUMMARY OF THE INVENTION

The invention provides a motor-driven compressor assembly, comprising a compressor air intake, a compressor rotor, a compressed air outlet and an electric motor for said compressor rotor, with the air intake of the compressor assembly being located so as to direct intake airflow to the compressor rotor into a heat transfer relationship with the electric motor. In the invention, the motor-driven compressor includes an outer casing and a housing for the electric motor that together form the air intake so the intake airflow through the air intake so formed cools the motor housing. The motor housing is, in preferred embodiments, a central barrel carrying the electric motor within an outer casing so the intake airflow surrounds the central barrel. The outer casing may also form a mounting surface for motor control electronics, and provide inner finned surfaces in the path of the intake airflow to cool the control electronics. Some embodiments of the invention include an operable air bypass between the compressor's air intake and compressed air outlet for use in some applications.

In motor-driven centrifugal air compressors of the invention, the components of the assembly are so arranged to utilize the intake airflow of the centrifugal compressor as a cooling media for both the motor components and control electronics to overcome the temperature limitations to power output from uncooled motor components.

DESCRIPTION OF THE INVENTION

Figure 2:
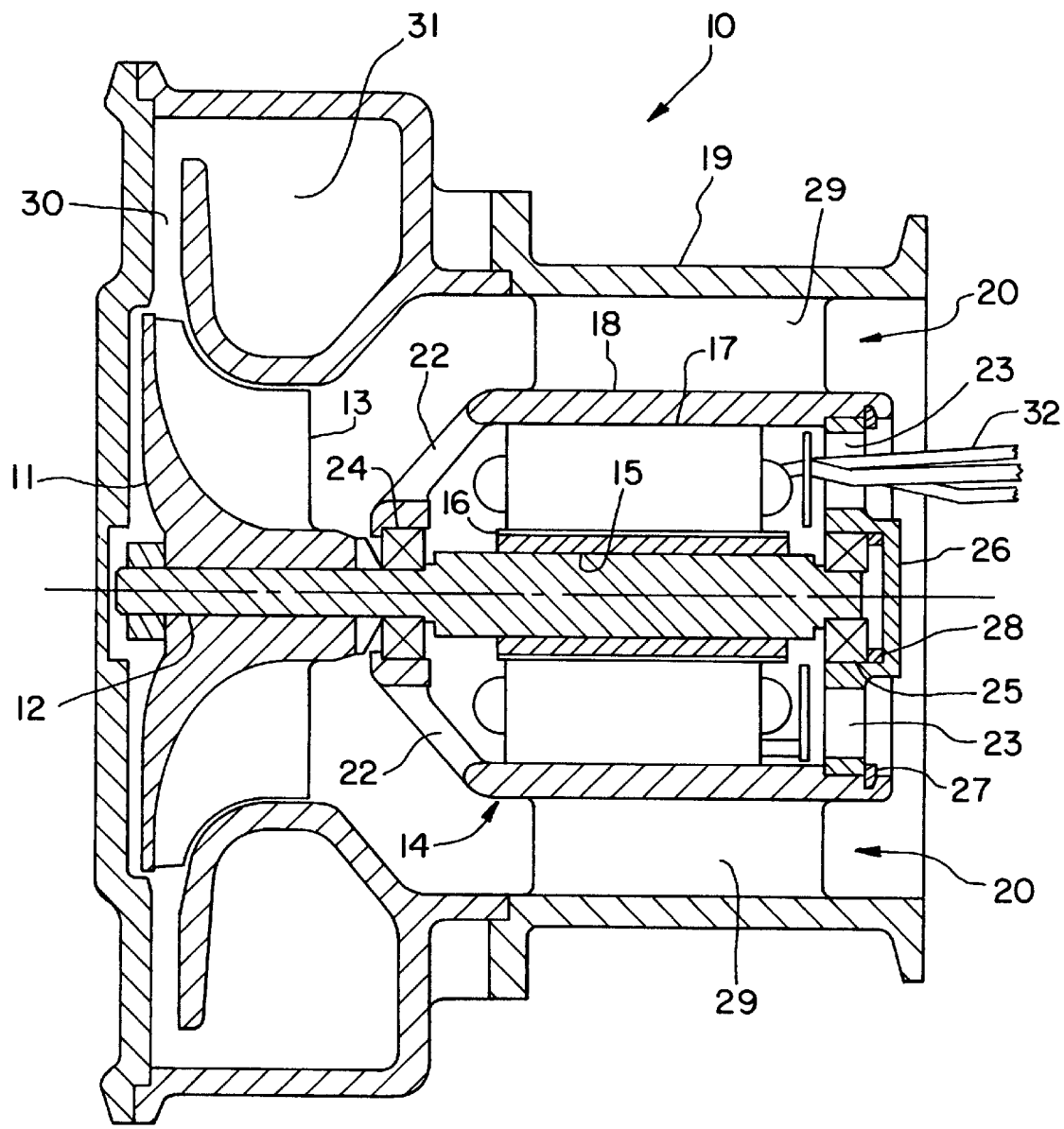
FIG. 2 is a cross-sectional view of a preferred motor-driven centrifugal air compressor of the invention taken at a plane through its center.

A preferred motor-driven centrifugal air compressor 10 of the invention is shown in cross-section in FIG. 2. In the motor-driven air compressor of FIG. 2, the compressor wheel 11 is mounted on a motor-driven shaft 12 with the air intake of the vanes 13 facing the motor 14. The motor magnet assembly 15 is constructed by encapsulating the magnets on the shaft 12 by an outer cylindrical sleeve 16. The motor windings 17 are mounted in a motor housing 18 within an outer casing 19.

Figure 1:
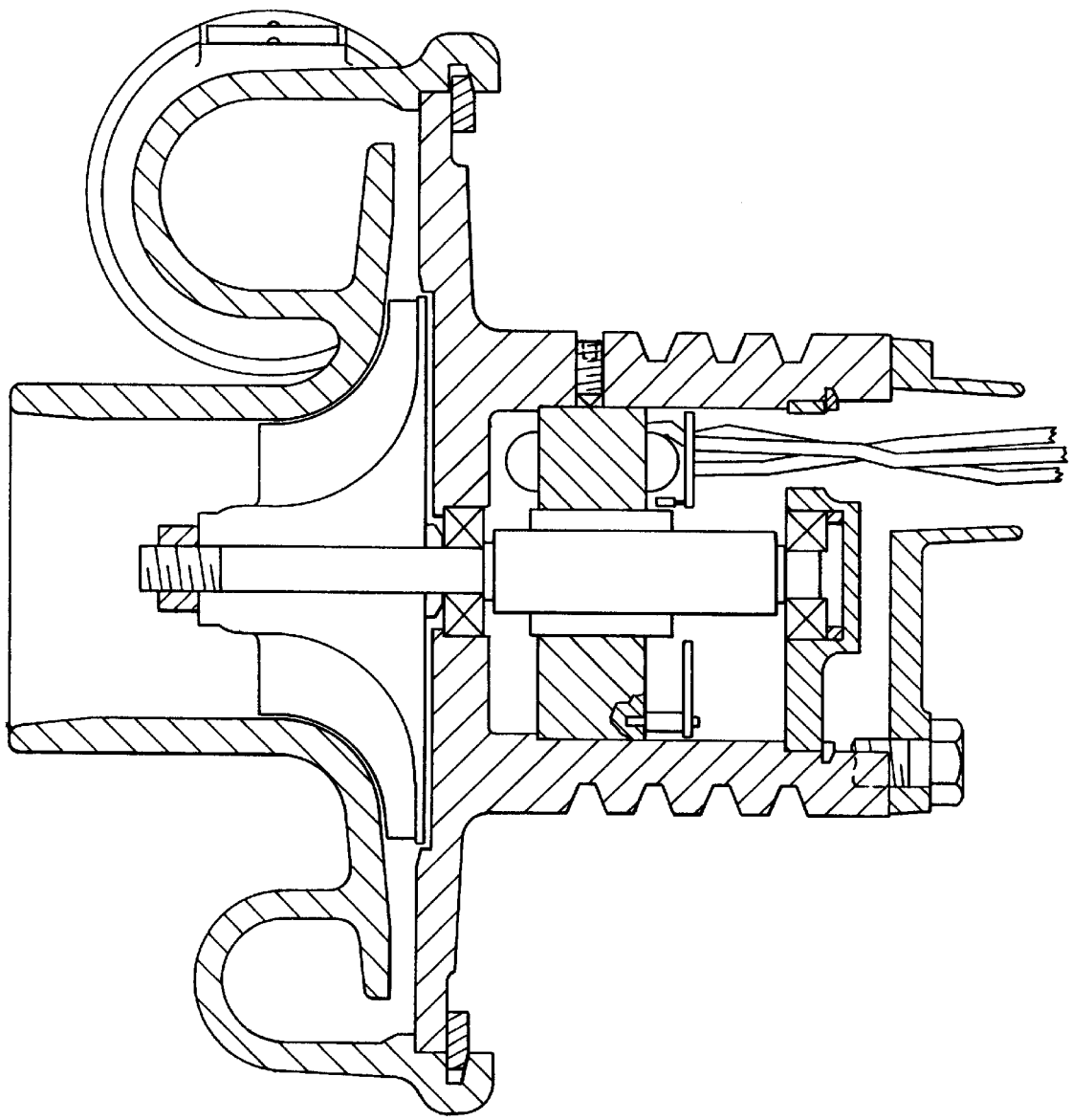
FIG. 1 is a cross-sectional view of a prior art motor-driven centrifugal air compressor taken at a plane through its center.

As shown in FIG. 2, the outer casing 19 and motor housing 18 form the air intake 20 to the compressor vanes 13 so that upon rotation of the compressor wheel 11 by the electric motor 14, the compressor vanes 13 draw an intake airflow through the air intake passage 20 formed between the outer casing 19, and motor housing 18. The intake air to compressor wheel 11 flows adjacent and in heat transfer relationship with the electric motor 14, that is, the intake airflow cools the motor housing 18 and thereby the motor windings 17, and the motor windings 17 are maintained at a lower temperature than if the motor housing were in contact with static ambient atmosphere as in the FIG. 1 apparatus. In addition, the ends of the motor housing 18 may be provided with openings 22 and 23 permitting the rotating compressor vanes 13 to induce a cooling airflow through the interior of motor housing 18 more directly adjacent the motor windings 17 and adjacent the motor magnets 15.

Ball bearings 24, 25 rotatably support the shaft 12 at the ends of the motor housing 18 as shown. A housing end cover 26 is retained in the motor housing 18 by retaining ring 27, and spring 28 is provided to ensure the proper pre-loading on the ball bearings 24, 25.

In the preferred embodiment shown in FIG. 2, the motor housing 18 is a central barrel located coaxially within and surrounded by the outer casing 19. The central barrel 18 is thus surrounded by the intake air passage 20 and is attached to the outer casing 19 by ribs 29. Air is induced through intake air passage 20 and through openings 22, 23 in the central barrel 18 by rotation of compressor wheel 11. The airflow over the central barrel 18 and adjacent the motor windings 17 cools the motor parts, keeping them at lower and acceptable operating temperatures. The intake air is compressed by the rotation of compressor wheel 11, passes through diffuser passage 30, and flows into the compressor casing 31.

A tangential outlet (not shown) from the compressor casing 31 can be, for example, connected to the air intake system of an internal combustion engine or the intake air system of some other industrial process that requires compressed air.

The motor wires 32 exit the end plate 26 through one of the openings 23 and can be led to an appropriate electronic control unit (not shown in FIG. 2), which controls operation of the motor 14.

Figure 3:
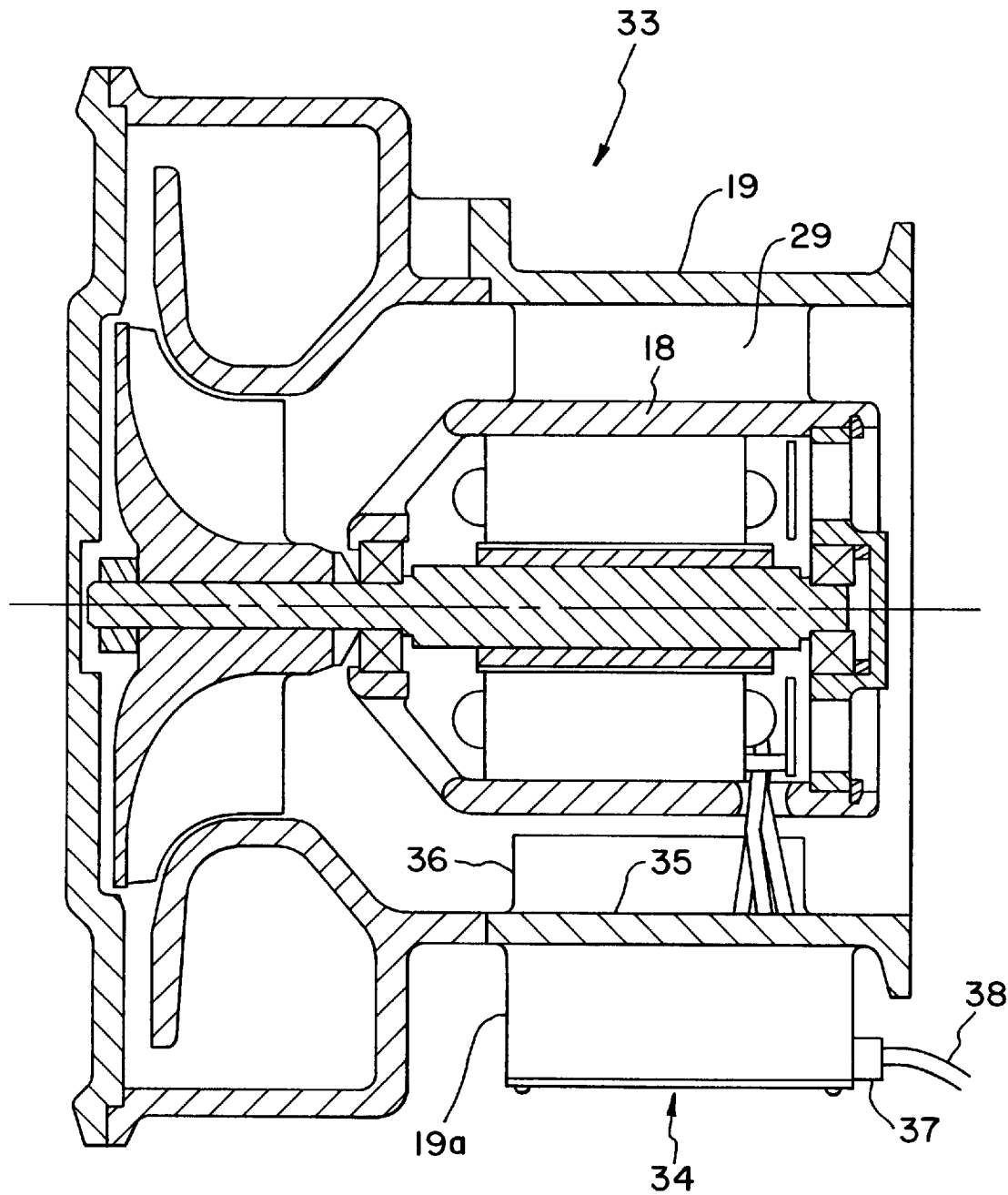
FIG. 3 is a cross-sectional view of another embodiment of the invention taken at a plane through its center.

An alternate preferred embodiment 33 of the invention is illustrated in FIG. 3. As illustrated in FIG. 3, one section 19a of the outer casing 19 protrudes to provide a mounting cavity 34 for the control electronics (not shown). The inner surface 35 of the outer casing adjacent the mounting cavity 34 includes a series of fins 36 in the intake airflow that can transfer heat generated in the control electronics to the intake airflow. Wire outlet 37 from the mounting cavity 34 is provided to permit electric current from a power source to enter the control electronics through electrical conduit 38.

The motors of existing motor-driven compressors usually have the motor windings connected to a remotely located controller, necessitating an appreciable length of control wires that must be protected from damage. The present invention eliminates the need for protecting control wires by forming a cooled mounting for the electronics as an integral part of the outer casing 19 and allows the inner surface of the mounting to incorporate cooling fins in the intake air stream as a heat sink.

Figure 4:
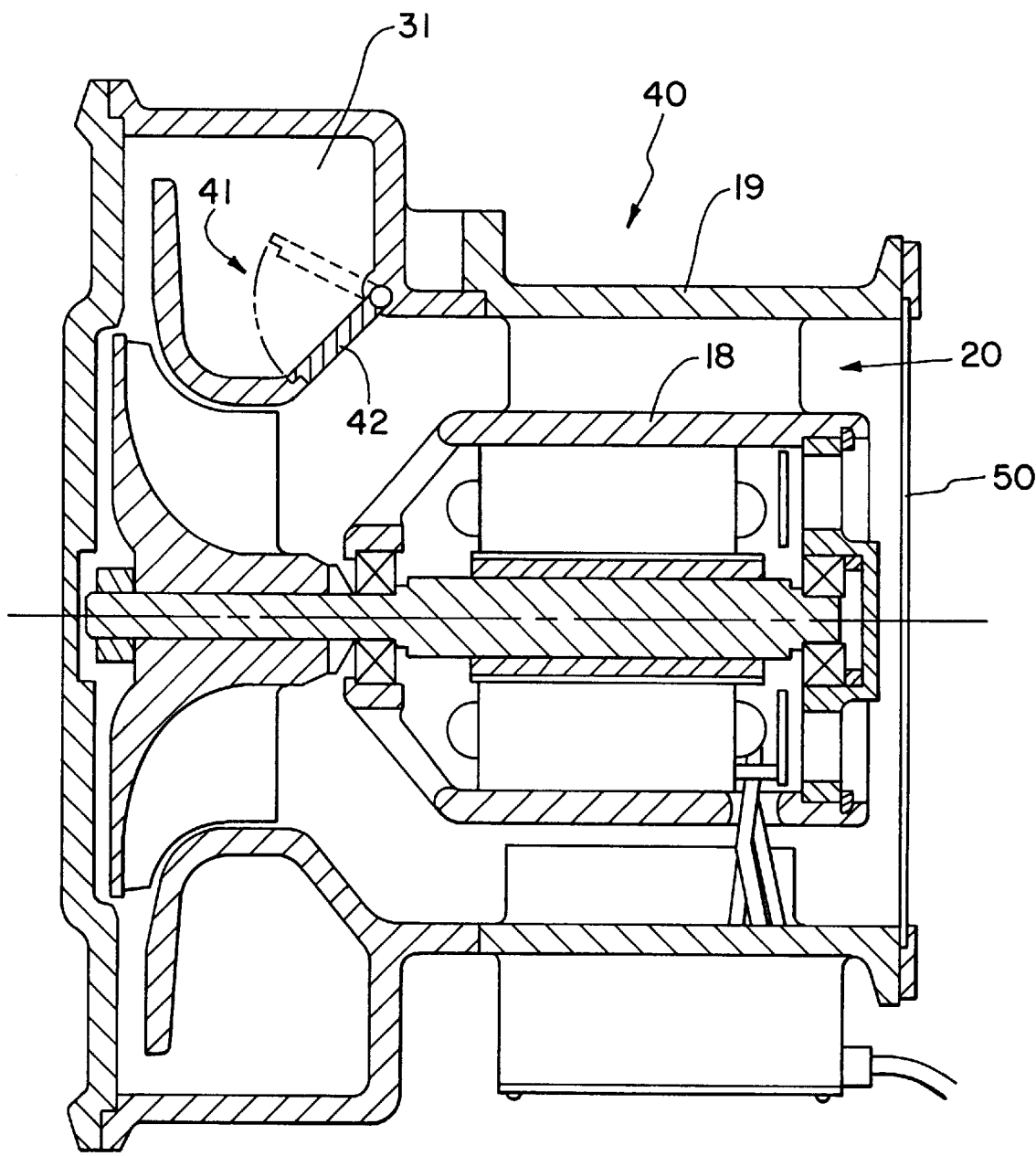
FIG. 4 is a cross-sectional view of a third embodiment of the invention take at a plane through its center.

The invention also provides motor-driven compressors for use in series with a turbocharger compressor on an internal combustion engine. An embodiment of motor-driven compressor 40 of the invention for such applications can include an internal air bypass valve 41 within the motor-driven compressor housing, as illustrated in FIG. 4. In such applications, a motor-driven compressor of FIG. 4 is provided upstream of the air intake of a conventional turbocharger for an internal combustion engine and is driven by the electrical system of the internal combustion engine to provide a flow of compressed air through the turbocharger air intake when the internal combustion engine is operating at idle or low speeds and the conventional turbocharger cannot supply a desirable flow of cylinder charge air. When the internal combustion engine is operating at rated load and speed in such systems, the motor-driven compressor may be de-energized to eliminate the use of electrical energy from the internal combustion engine electrical system, and the internal bypass valve 41 can be opened to allow the engine turbocharger to obtain its intake airflow with minimal resistance through the motor-driven compressor 40. As shown in FIG. 4, the air bypass valve 41 can be formed by a flapper 42 hinged to and supported by the outer casing 19 between the air intake passage 20 and the compressor casing 31. The flapper 42 may be operated by an electrical solenoid (not shown) mounted to the outer casing 19 and connected with an operating arm (not shown) attached to flapper 42. The open end 20 of the outer casing 19 may be covered with an air filter 50, as shown in FIG. 4.

The sequence of operation of such internal combustion engine systems is as follows: When the internal combustion engine is started, the motor-driven compressor 40 is energized to a first speed level at which it provides a significant boost pressure to the internal combustion engine in preparation for engine acceleration under load. This level of boost is much higher than can be supplied by the engine turbocharger alone under these engine operating conditions. When the engine throttle is opened to accelerate the engine, the motor-driven compressor 40 is super-energized, for example, by increasing its speed of rotation with the control electronics, to assist the engine turbocharger in providing boost pressure during the acceleration period. When the engine turbocharger has reached a level where it is capable of supplying sufficient charge air for efficient combustion of the injected fuel, the motor-driven compressor is de-energized by the control electronics. The internal bypass valve 41 opens anytime the pressure in the compressor casing 31 falls below the pressure in the intake air passage 20. This allows the engine turbocharger to draw intake air through the motor-driven compressor with minimal resistance to the flow.

If a motor-driven compressor of the invention 10, 33 is to be used for an application such as pneumatic conveying of dry bulk material, the air intake openings of the outer casings 19 may be fitted with an appropriate air filter. In other applications requiring compressed air, a simple screen to keep out foreign material may be used. Mounting feet may be located at convenient places on the outer casing 19, depending on the type of service in which the compressor is to be used.

Integrating the compressor components, motor components, and electronic control in a single compact structure, where intake airflow is used to cool the motor parts, provides an economical, compact assembly that has a high power output rating by virtue of the large volume of the intake airflow that is used for cooling the electric motor, and the incorporation of an air bypass valve extends the applications in which such motor-driven compressors may be used.

While we have shown and described what we believe to be the best mode of our invention, other embodiments may be derived by those skilled in the art without departing from the spirit and scope of the following claims, which are limited in scope by only the prior art.

We claim:

1. A compact motor-driven compressor, comprising
   a compressor housing including an outer casing and an inner motor support, both of said outer casing and said inner motor support being open at their one ends;
   an electric motor including motor windings and a plurality of magnets carried by and driving a rotating shaft carried by ball bearings, said motor windings and ball bearings being supported by said inner motor support; and
   a centrifugal compressor wheel carried and driven by said rotating shaft with an air intake facing an opening at the other end of the inner motor support,
   said compressor housing forming a peripherally-located compressed air outlet from said compressor wheel,
   said outer casing and inner motor support of said compressor housing forming flow paths for ambient air leading from the open ends of said outer casing and inner motor support to the air intake of the compressor wheel, said flow paths extending between the outer casing and inner motor support and through the inner motor support.

2. A motor-driven compressor as in claim 1, wherein a protrusion of said outer casing forms a mounting surface for control electronics, and said outer casing provides inner finned surfaces in the path of the intake airflow.

3. A motor-driven compressor as in claim 1, wherein the air intake includes an open end formed by the outer casing and covered by an air filter.

4. A motor-driven compressor as in claim 1, wherein the outer casing includes a bypass flapper valve between the compressor air intake and compressed air outlet.

5. A motor-driven compressor as in claim 1 wherein an electronic motor control is mounted on the compressor housing in heat transfer relationship with the flow path for ambient air between the outer casing and inner motor support.

6. A motor-driven compressor as in claim 1 wherein a mounting surface for an electronic control is formed by the outer casing and wherein said outer casing forms a finned inner surface located in the ambient airflow path to provide heat sink for the electronic control.

7. A compact motor-driven air compressor, comprising
   a motor housing for carrying an electric motor and a motor driven shaft, with a portion of said shaft extending outwardly of the motor housing at one end, said outwardly extending portion of said motor-driven shaft carrying a compressor rotor, and
   an outer housing surrounding said motor housing and compressor rotor and carrying said motor housing, said outer housing forming an air inlet for said compressor and directing flowing air adjacent said motor housing and to the compressor rotor, said motor housing having open ends permitting airflow to said compressor to reach the interior parts of said motor housing, said outer housing also forming a casing for receiving compressed air from said compressor rotor.

8. The compact motor-driven air compressor of claim 7 wherein said motor housing is carried coaxially within said outer housing.

9. The compact motor-driven air compressor of claim 7 wherein control components for the electric motor are carried by the outer housing and cooled by air entering the air inlet.

10. The compact motor-driven air compressor of claim 9 wherein the control components are carried by the outer housing adjacent one or more cooling fins formed within the outer housing in the path of air entering the air inlet.

11. A motor-driven compressor, comprising
   an inner motor support carrying electric motor stator windings and a pair of bearings, and an electric motor rotor and motor shaft carried by said pair of bearings and rotatable by said motor stator windings, said rotatable motor shaft having a portion extending outwardly of one end of the inner motor support;
   a centrifugal compressor wheel with air compressing vanes having central portions for air to be compressed and peripheral portions for ejection of compressed air, said compressor wheel being carried by said outwardly extending portion of the rotatable motor shaft, and
   an outer housing surrounding said inner motor support and said centrifugal compressor wheel, said outer housing having an open end and forming, with said inner motor support, an air inlet for the central portions of the air compressing vanes, said outer housing further forming a peripheral compressed air conduit around the peripheral portions of the air compressing vanes,
   said outer housing including an operable air bypass between said air inlet to said central portions of the air compressing vanes and said peripheral compressed air conduit.

12. The compact motor-driven compressor of claim 11 wherein the operable air bypass is a pressure actuated flapper valve carried by the outer housing adjacent the central portions of the air compressing vanes.

13. The motor-driven air compressor of claim 11 wherein said inner motor support has open ends for transmission of ambient temperature air through said open ends and adjacent the electric motor components to the central portions of said air compressing vanes.

14. The motor-driven air compressor of claim 11 wherein a control for the electric motor is mounted in heat transfer relationship with the air inlet formed between said outer housing and inner motor support.

15. The motor-driven air compressor of claim 14 wherein the interior of said air inlet for the central portions of said air compressing vanes includes a plurality of air-cooled heat transfer surfaces in heat transfer relationship with said control.

* * * * *